XR 3,832,565

United States Patent

Graf et al.

[11] 3,832,565

[45] Aug. 27, 1974

[54] HOLOGRAPHIC MEMORY WITH DODECAHEDRON DETECTOR MATRIX

[75] Inventors: Peter Graf; Manfred Lang, both of Munich, Germany

[73] Assignee: Siemens Aktiengesellschaft, Berlin & Munich, Germany

[22] Filed: May 14, 1973

[21] Appl. No.: 359,846

[30] Foreign Application Priority Data

May 18, 1972 Germany.......................... 2224350

[52] U.S. Cl................ 250/566, 250/211 R, 350/3.5
[51] Int. Cl........................ H01l 15/00, G02b 27/00
[58] Field of Search........................ 350/3.5, DIG. 1; 340/173 LT, 173 LM; 250/203 R, 211 R, 211 J, 219 D, 566

[56] References Cited

UNITED STATES PATENTS 3,448,273 6/1969 Webb................................ 250/203
3,704,929 12/1972 Sakaguchi et al.................. 350/3.5

*Primary Examiner*—Ronald J. Stern
*Attorney, Agent, or Firm*—Hill, Gross, Simpson, Van Santen, Steadman, Chiara & Simpson

[57] ABSTRACT

A device for retrieving information stored in the form of sub-holograms on a storage medium comprising a light source, means for holding the storage medium and a detector matrix characterized by the detector matrix comprising a plurality of plane detector matrices each of which has an array of light detectors and the matrices are arranged with the plane surfaces of adjacent matrices forming an angle so that each of the matrices is assigned to receive information retrieved from a portion of the storage medium. The detector matrices may have a polygon surface such as a pentagon and are arranged to form a single polyhedral detector mattix such as a detector matrix consisting of a semi-dodecahedron.

1 Claim, 3 Drawing Figures

3832565
OR IN 250/566

HOLOGRAPHIC MEMORY WITH DODECAHEDRON DETECTOR MATRIX

BACKGROUND OF THE INVENTION

1. Field of the Invention

The present invention relates to an arrangement for retrieving holographically stored data comprising a light source, means for supporting a storage medium with data stored in the form of subsidiary holograms and a detector matrix.

2. Prior Art

In the field of data processing, there is an increasing requirement to increase the storage capacity of a storage device. Due to the high density at which data can be accommodated in cross section of a light beam, interest in the use of optical storage devices has been increasing.

If coherent light is spatially modulated, the data transported by the light beam can be holographically stored by projecting the modulated light beam and a reference beam to produce an interference band system that contains the information to be stored. In such a system, any spatial frequency, for example interference band frequency, may be assigned as one unit of binary data. Thus, the presence of any bit may represent binary 1 and the absence of any one bit may be equal to the binary 0.

Each bit corresponds to one point on the object surface whose associated interference field may be uniformly stored on the entire surface of the hologram. The points are arranged in a spatial pattern. If the spatial pattern is illuminated by a beam of coherent light projected onto the hologram surface, the binary numbers may be recorded in a parallel mode in the hologram.

During a retrieval operation in the parallel mode, a separate and single photo detector is required for each bit of data. With a limited degree of technical equipment, it is impossible to read out the entire contents of a large capacity storage hologram in the parallel mode. However, the storage surface can be subdivided into small subsidiary holograms or sub-holograms with each sub-hologram having a capacity that is a fraction of the overall capacity of the entire storage medium. Thus, each of the sub-holograms can be read out in a parallel mode and in a typical case each sub-hologram may have the capacity in the order of $10^3$ to $10^5$ bits. During a read out or retrieval process, only one subsidiary hologram is reconstructed at a time by selectively illuminating the portion of the surface constituting the sub-hologram with an illuminating or reproducing beam. The reproducing beam is selectively projected on selected portions of the surface by a deflector unit.

The total storage capacity of the storage plate is the product of the number of sub-holograms, which number is usually determined by the number of beam directions, which can be differentiated by the deflector unit, multiplied by the capacity of one sub-hologram.

In order to be able to provide a holographic storage plate with sub-holograms, the illuminating beam must in each case be directed onto the selected region of the storage plane on which a sub-hologram is to be recorded. The control of the beam may be accomplished for example by displacing the optical lens system about its plane and such a system for controlling the beam is disclosed in U.S. Pat. application, Ser. No. 260,136, which was filed on June 6, 1972. The high storage density, which is required in practice, necessitates optical systems with a small F-number, but the F-number and the image circle diameter of an optical lens system are subject to limits which restrict the capacity of the recording beam. Thus, the overall storage capacity, which may be obtained with an arrangement of the known type, is generally limited to a few $10^7$ bits.

The geometric dimensions of the detector matrix are linked with the overall capacity of the data carrier of a holographic storage medium. A detector matrix, in the same way as a microscope or eye, posses a limited field of vision. This results in the fact that a larger overall capacity can only be achieved if both the storage surface and the area of the detector matrix are made large. Thus, for example in retrieving or reading out a geometrically optimized plane of a storage medium containing $10^{10}$ bits by using a red He-Ne laser light wavelength and adhering to the technically reasonable safety clearances between the reconstructed light points, one requires a square detector matrix having a diagonal extent of approximately 1 meter.

While the illuminating wave may be controlled with the aid of classical optical components, such as lenses and reflectors, it is desirable, however, to use a detector matrix which is as small as possible and preferably a detector matrix which was produced by integrated circuit techniques. The data mask of the holographic storage medium do in fact have geometric dimensions which are identical to the dimensions of the detector matrix and during the recording process must be illuminated by an object wave which is pivoted and focused onto the individual sub-hologram positions.

In order to increase the storage capacity, it has been proposed that the storage medium be curved in order to provide an increased field of vision for a given plane detector matrix. In this proposed system, the detector matrix may be placed in front of, behind or at the center of curvature of the storage medium. However, since every detector matrix possess a limited field of vision, some problems have arisen in retrieving information stored in sub-holograms located at the edge of the field of vision for the detector matrix.

SUMMARY OF THE INVENTION

The present invention is directed to providing an arrangement for retrieving information stored as holograms on a storage medium which arrangement enables a further increase in the storage capacity of the storage medium. The arrangement includes means for positioning a storage medium which contains the data stored in the form of subsidiary or sub-holograms, a light source for projecting a reference wave onto the selected subsidiary holograms in the storage medium, and a detector matrix positioned to receive the optical object wave reconstructed from the subsidiary holograms with the improvement comprising the detector matrix which is composed of a plurality of individual detector matrices each having an array of light detectors. Each of the individual matrices have a substantial plane surface and the corresponding light detector of individual detector matrices are interconnected by common electrical leads. The plane surfaces of adjacent matrices being arranged at an angle to the plane of adjacent matrices and each of the matrices being arranged to receive information from a different assigned area or part of the surface of the storage medium. The individual detector matrices are preferably in the shape of a polygon such as a pentagon and are arranged so that the matrices form a single polyhedral detector matrix which preferably comprises a half or semi-dodecahedron.

DESCRIPTION OF THE PREFERRED EMBODIMENTS

Figure 3:
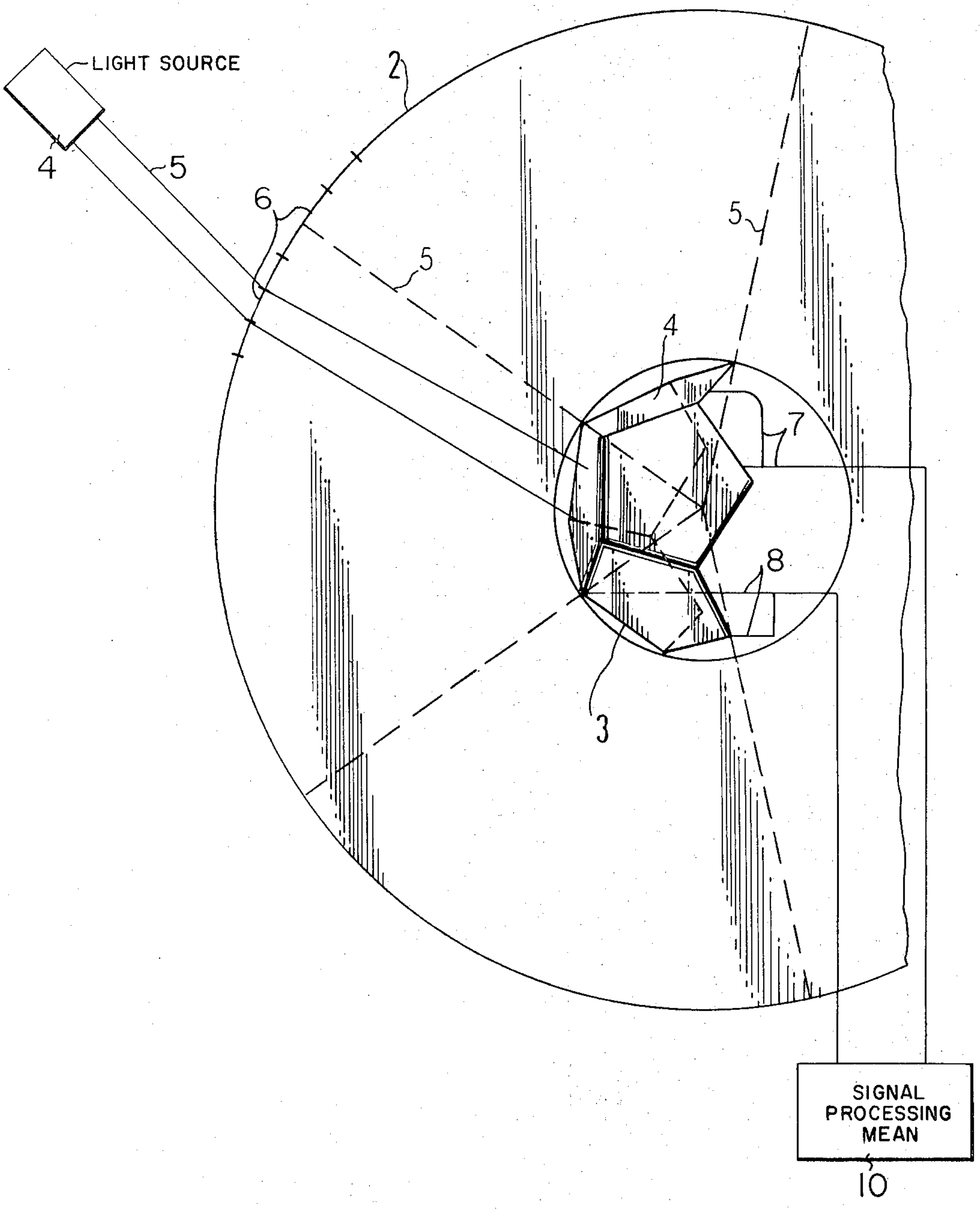
FIG. 3 is a schematic arrangement according to the present invention for retrieving information holographically stored on a curved storage medium.

The principles of the present invention are particularly useful when incorporating in a detector matrix illustrated in the figures and utilized in an arrangement schematically illustrated in FIG. 3.

Since every detector matrix possess only a limited field of vision, a detector matrix of a given dimension for a holographic retrieval system is unable to read out or retrieve information stored on portions of a storage medium which are located out of the field of vision of the matrix and thus the area of the storage medium is limited by the field of vision of the matrix. It has been discovered that the storage capacity accessible in the case of a rapid random access may be increased, if several detector matrices are used. In this case, each detector matrix must be assigned one part of the area of a large storage medium which part lies in the field of vision of the particular matrix.

Figure 1:
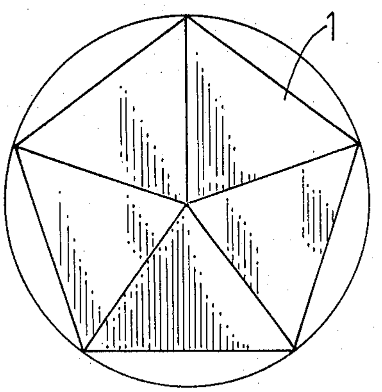
FIG. 1 shows an exemplary embodiment of one single detector matrix.
Figure 2:
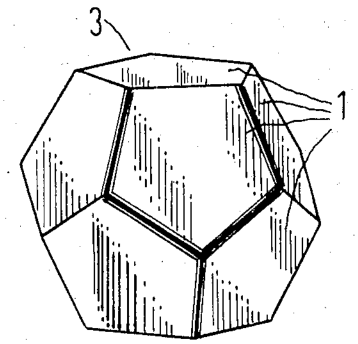
FIG. 2 shows an exemplary embodiment of an assembled detector matrix.

In FIG. 1, an exemplary embodiment of a single detector matrix 1 which possess the shape of a regular pentagon is illustrated. The matrix 1 is provided with an array of light detectors in a suitable pattern such as a raster pattern of columns and rows. This shape exhibits the special advantage that the individual detector matrices 1 can be assembled particularly favorably to form a combined detector matrix 3 (FIG. 2) having a polyhedral arrangement. It is noted that the polyhedral arrangement of FIG. 2 presents a semi-dodecahedron formed from a plurality of pentagonal detector matrices 1. Each of the detector matrices 1 of the matrix 3 have a plane surface with a shape of a pentagon. The plane surfaces of adjacent matrices 1 are arranged to form an angle therebetween.

The semi-dodecahedron arrangement 3 is particularly useful for retrieving information from a curved storage surface 2 which is schematically illustrated in FIG. 3. The arrangement for retrieval includes a light source 4 for projecting a reference wave 5 on various selected portions or subholograms 6 of the curved storage medium 2 which is supported by an appropriate means. The combined detector matrix 3, which is a semi-dodecahedral arrangement, is disposed adjacent the center of curvature for the storage medium 2 with each of the pentagon faces arranged to receive the reconstructed object waves from various portions of the curved storage medium 2. For example, a detector matrix 4 has a field of vision shown by the dash lines 5 and will receive information stored in the portion of the curved storage medium 2 included in the angle formed by the broken lines 5.

As illustrated, the field of vision of the combined detector matrix 3 is equal to the sum of the fields of vision of the individual matrices 1. In electronic data transmission, corresponding light detectors of individual detector matrices are interconnected by common electrical leads such as leads 7 and 8 which extend to a single processing means 10. In the selected exemplary embodiment of FIG. 3, the relative field of vision for the combined matrix 3 is greater than 180°. A semi-dodecahedron of this kind, composed of six pentagonal detector matrices each having a periphery of 10 cm can retrieve approximately $4 \times 10^9$ bits of information when utilizing a reference wave from a light source such as a laser having a wavelength of $\lambda = 3.66 \times 10^{-5}$ cm. The center of the semi-dodecahedron can be arranged at the center of curvature of the storage medium 2 as illustrated or it can be arranged in front of or behind the center if desired.

Although minor modifications might be suggested by those versed in the art, it should be understood that we wish to employ within the scope of the patent granted hereon, all such modifications that resonably and properly come within the scope of out contribution to the art.

We claim:

1. In an arrangement for retrieving information stored on a holographic storage medium, said arrangement comprising a means for positioning a storage medium which contains data stored in the form of subsidiary holograms, a light source for projecting a reference wave onto selected subsidiary holograms of the storage medium, and a detector matrix positioned to receive the object wave reconstructed from the subsidiary holograms, the improvement comprising the detector matrix consisting of a semi-dodecahedron and being composed of a plurality of individual detector matrices with each of the matrices having an array of light detectors and corresponding light detectors of each of the detector matrices being interconnected by common electrical leads, each of said individual matrices having a plane surface with a shape of a pentagon, the plane surfaces of adjacent matrices being arranged at an angle to each other and being arranged to receive information from different assigned parts of the surface of the storage medium.

* * * * *